United States Patent

[11] 3,601,339

[72] Inventor Ian A. Watson
  Lewisham, London, England
[21] Appl. No. 734,056
[22] Filed June 3, 1968
[45] Patented Aug. 24, 1971
[73] Assignee Elliott Brothers (London) Limited
  London, England

[54] AIRCRAFT-LANDING SYSTEMS
  6 Claims, 1 Drawing Fig.
[52] U.S. Cl. .................................................. 244/77 A,
  343/108
[51] Int. Cl. .................................................. B64c 13/18
[50] Field of Search .......................................... 244/77 A,
  77 D; 318/20.209; 343/108

[56] References Cited
UNITED STATES PATENTS
| | | | |
|---|---|---|---|
| 2,888,219 | 5/1959 | Beers et al. | 244/77 |
| 3,295,796 | 1/1967 | Gaylor | 244/77 |
| 3,327,973 | 6/1967 | Kramer et al. | 244/77 |
| 3,031,662 | 4/1962 | Bond | 244/77 AX |
| 3,223,362 | 12/1965 | Doniger | 244/77 A |

Primary Examiner—Milton Buchler
Assistant Examiner—Jeffrey L. Forman
Attorney—Imirie and Smiley ABSTRACT: The present invention resides in a system employing a modified glide slope control law to give a more precise control over the glide slope made in landing and also over the flare or flareout thereof. The modified law which defines a pitch attitude demand signal ($\theta_D$) reads:

$$\theta_D = G_\beta \left[ 1 + \frac{1}{ST_1} + \frac{Ks}{(1+T_3 s)(1+T_4 s)} \right] \frac{\beta}{(1+T_2 s)}$$

in which:
$\theta_D$ = pitch attitude demanded by the control law;
$G_\beta$ = glide slope gearing ratio viz: the number of degrees of pitch attitude demanded per degree of deviation from the glide slope;
$\beta$ = glide slope deviation;
$T_2$ = the lag time constant afforded by the provision of smoothing capacitors on the glide slope receiver output; and
$K$, $T_3$ and $T_4$ are constants for the aircraft in which the system is installed.

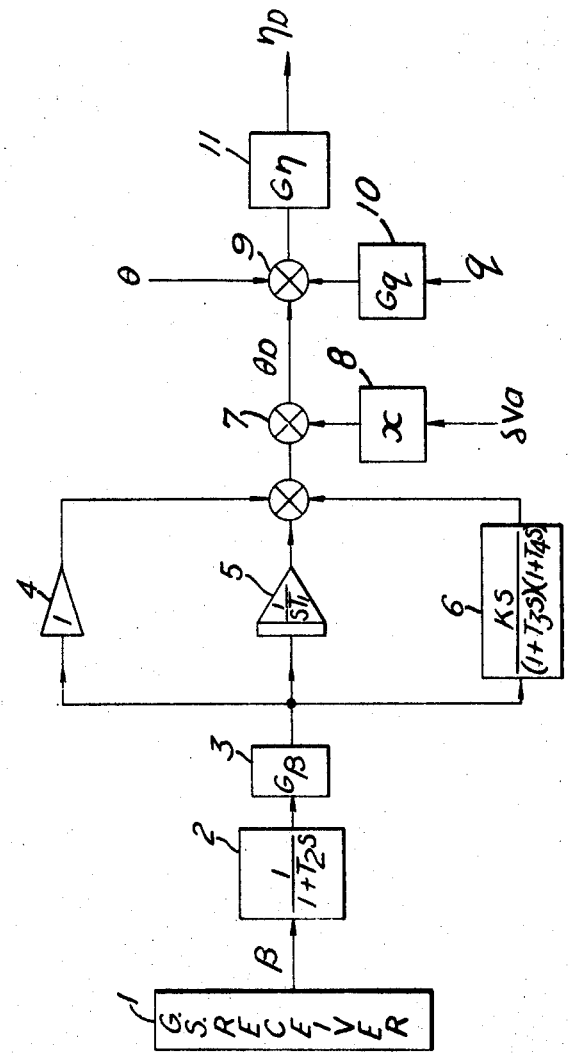

AIRCRAFT-LANDING SYSTEMS

The present invention relates to an aircraft-landing system.

Landing systems are known employing means (hereinafter referred to as the G.S. receiver) to receive glide slope data transmitted from the ground and to provide therefrom a control signal by which ideally the aircraft is maintained on the glide slope. Such systems operate according to a predetermined control law to provide inter alia a pitch attitude demand signal from which is derived a control signal i.e. an elevator demand signal, to control the pitch attitude of the aircraft.

A glide slope control law heretofore employed for computing a pitch attitude demand signal requires an integral and proportional control signal and may be expressed as follows:

$$\theta_D = G_\beta \left[1 + \frac{1}{ST_1}\right] \frac{\beta}{1+T_2 s}$$

where $\theta_D$ = pitch attitude demanded by the control law and hereinafter called the predetermined pitch attitude.

$G_\beta$ = glide slope gearing ratio which is the number of degrees of pitch attitude demanded per degree of deviation from the glide slope, $\beta$ = glide slope deviation, $T_2$ = is the lag time constant afforded by the provision of smoothing capacitors on the G.S. receiver output.

It will be understood that the more accurately the proportionality constants used represent the proportionality actually existing between $\theta_D$ and $\beta$, the more precise will be the control of the aircraft that can be exercised by means of the control signal.

The present invention seeks to provide a landing system employing a glide slope control law by means of which a more precise control of the aircraft over a glide slope mode of operation may be achieved. The invention further seeks to provide such landing system which may also be used to provide a more precise control over the flare phase of landing of the aircraft.

The present invention is based on the idea of modifying the above-mentioned glide slope law such that it may be expressed as follows:

$$\theta_D = G_\beta \left[1 + \frac{1}{ST_1} + \frac{Ks}{(1+T_{3s})(1+T_{4s})}\right] \frac{\beta}{(1+T_2 s)}$$

The symbols K, $T_3$ and $T_4$ represent constants. The values of these constants are different for different aircraft but for a particular aircraft are determined by the aerodynamic characteristics of the aircraft.

In a further embodiment of the present invention for use over the flare phase of landing i.e. the period between priming the aircraft for automatic landing, and touchdown, a further term is added consisting of $\chi\delta Va$ where $\chi$ is the airspeed crossfeed gearing ratio and $\delta Va$ the airspeed error (Viz the deviation of the instantaneous air speed from a predetermined airspeed as provided by the control law employed by the aircraft control system to control airspeed). The gearing ratio over the flare phase will usually be 0.6° $\eta_D$/knot ± 10 percent where $\eta_D$ is the elevator demand. The airspeed error signal may be derived from suitable airspeed error indicator means such as described in our copending U.S. Pat. No. 3,425,649.

The predetermined pitch attitude demand signal as produced by the modified control law according to the present invention is then used to derive an elevator demand signal. This is effected (A) by summing the predetermined pitch attitude demand signal with the following components: (1) a signal representing $\theta$, the instantaneous pitch attitude, and (2) a signal representing the term $q \cdot G_q$ in which $q$ is the instantaneous pitch rate and $G_q$ is the pitch rate gearing ratio; and (B) by multiplying the pitch attitude demand signal thus produced by the term $G\eta$, namely the elevator demand gearing ratio, to produce the elevator demand signal ($\eta_D$).

An embodiment of the invention will now be described with reference to the accompanying drawing the sole FIGURE of which is a block diagrammatic representation of the embodiment.

The apparatus of the embodiment comprises the conventional components of a G.S. receiver 1, a lag circuit 2 to produce the lag term $1/(1+T_2 s)$, a circuit 3 for producing the gearing signal $G_\beta$, an amplifier 4 to provide the first proportional term of unity and an integrator 5 producing the integral term $1/T_1 s$; and a further lag circuit 6 comprising a passband filter to produce the additional term $Ks1[(1+T_{3s})(1+T_{4s})]$ according to the invention.

The output of the G.S. receiver is fed to the lag circuit 2 to give the output $\beta/(1+T_2 s)$ which is then received by the circuit 3 to give the output $G_\beta(\beta/(1+T_2))$ This output is fed simultaneously to the amplifier 4, the integrator 5 and the further lag circuit 6 to introduce the respective terms produced by these components and the outputs therefrom are combined to produce the composite term $$G_\beta \left[1 + \frac{1}{T_1 s} + \frac{Ks}{(1+T_{3s})(1+T_{4s})}\right] \frac{\beta}{(1+T_2 s)}$$

representing $\theta_D$ the predetermined pitch attitude demand signal. This signal is then added to at a summing point 7 by the output of a circuit 8 representing the term $\chi\delta Va$, and the resulting signal is fed to a further summing point 9 to which are also fed a signal representing $\theta$ and a signal representing $q-Gqq$ the latter signal being derived by a circuit 10 from a signal representing instantaneous pitch rate fed to the input thereof. The pitch attitude demand signal produced at the output of the summing point 9 is then fed to a circuit 11 to introduce the term $G\eta$ and produce the elevator demand signal ($\eta_D$) at the output thereof.

The "airspeed crossfeed gearing ratio" and "pitch rate gearing ratio" are constants relating the variables $\delta V a$ and $q$ dimensionally to the pitch demand signal $\theta_D$. It can be established by consideration of the dimensions in the two members of the equation that airspeed crossfeed gearing ratio may be expressed as $\partial\theta_D/\partial\delta V$ and pitch rate gearing ratio as $\partial \theta_D/\partial\alpha$. The "elevator demand gearing ratio" may be expressed as $\delta\eta/\delta\eta_D$. The actual values of these ratios, of course, are determined by the design of the control system in relation to a particular type of aircraft, and in particular by the circuit parameters of the system. The existence of such ratios, and the way in which they are designed into the system, are not in themselves considered novel, as such ratios exist in any sufficiently sophisticated servosystem.

I claim:

1. An aircraft-landing system comprising a glide slope receiver to receive glide slope data transmitted from the ground, and means receiving an output of the glide slope receiver to provide a pitch attitude demand signal hereinbelow called the predetermined pitch attitude demand signal) in accordance with a glide slope control law, including at least an integral function and a proportional function of glide slope deviation, and wherein multiplier means are connected in circuit for contributing to the predetermined pitch attitude demand signal as a further component thereof, a function of $\delta V_a$, $\delta V_a$ being the difference between the actual and demanded airspeeds.

2. An aircraft-landing system according to claim 1, wherein the function of $\delta V_a$ is the airspeed crossfeed gearing ratio ($x$).

3. An aircraft-landing system according to claim 2, wherein the airspeed crossfeed gearing ratio ($x$) employed is one having the value: 0.6 percent $\eta_D \pm 10$ percent, in which $\eta_D$ is the elevator demand signal.

4. An aircraft-landing system comprising in combination the following means for producing an elevator demand signal from component signals:

1. a system according to claim 1 for generating a first signal;
2. means for generating a second signal, said second signal representing instantaneous pitch attitude ($\theta$);

3. multiplier means generating a third signal, said third signal representing a term $qG_q$ in which $q$ is the instantaneous pitch rate and $G_q$ is the pitch rate gearing ratio;
4. a summing means for summing said first, second and third signals; and
5. multiplier means, receiving said summated first, second and third signals and multiplying them by a fourth signal representing $G\eta$, the elevator demand gearing ratio of the aircraft, whereby there is produced at the output of said multiplier means an elevator demand signal ($\eta_D$).

5. A system according to claim 1, wherein the output of the glide slope receiver is a signal representing $\beta$, the glide slope deviation, and wherein said system comprises:
1. a first multiplier circuit to provide the term $1/1+T_2S$, said circuit receiving as an input, said output signal of said glide slope receiver and producing an output signal representing the term $\beta[1/(1+T_2S)]$,
2. a second multiplier circuit to provide the term $G_\beta$, the pitch attitude gearing ratio, said second multiplier circuit receiving as an input, the output signal of said first multiplier circuit and producing an output signal representing the term $\beta[1/(1+T_2S)]G_\beta$,
3. an amplifier to provide the first proportional term of unity,
4. an integrator to provide the integral term $1/T_1s$,
5. a lag circuit to provide the term $KS/[(1+T_3S)(1+T_4S)]$,
6. summing means providing a common output from said amplifier, said integrator and said lag circuit, and
7. means for feeding said output signal of said second multiplier circuit simultaneously to said amplifier, said integrator and said lag circuit to produce in said common output, a signal $\theta_D$, the predetermined pitch attitude signal, representing the following terms:

$$G_\beta\left[1+\frac{1}{T_1S}+\frac{KS}{(1+T_3S)(1+T_4S)}\right]\frac{\beta}{(1+T_2S)}$$

6. An aircraft-landing system comprising in combination the following means for producing an elevator demand signal from component signals:
1. a system according to claim 5 for generating a first signal;
2. means for generating a second signal, said second signal representing instantaneous pitch attitude ($\theta$);
3. multiplier means generating a third signal, said third signal representing a term $qG_q$ in which $q$ is the instantaneous pitch rate and $G_q$ is the pitch rate gearing ratio;
4. summing means for summing said first, second and third signals; and
5. multiplier means, receiving said summated first, second and third signals and multiplying them by a fourth signal representing $G\eta$, the elevator demand gearing ratio of the aircraft, whereby there is produced at the output of this multiplier means an elevator demand signal ($\eta_D$).